(12) United States Patent
Bagshaw et al.

(10) Patent No.: US 9,191,125 B2
(45) Date of Patent: Nov. 17, 2015

(54) ACOUSTIC TRANSMISSION (75) Inventors: John Martin Bagshaw, Chelmsford (GB); Lionel William John Kent, Chelmsford (GB)

(73) Assignee: BAE SYSTEMS PLC, London (GB)

(*) Notice: Subject to any disclaimer, the term of this patent is extended or adjusted under 35 U.S.C. 154(b) by 931 days.

(21) Appl. No.: 13/393,729

(22) PCT Filed: Sep. 6, 2010

(86) PCT No.: PCT/GB2010/051470
§ 371 (c)(1),
(2), (4) Date: Mar. 1, 2012

(87) PCT Pub. No.: WO2011/027169
PCT Pub. Date: Mar. 10, 2011

(65) Prior Publication Data
US 2012/0163128 A1 Jun. 28, 2012

(30) Foreign Application Priority Data

Sep. 4, 2009 (EP) .................................. 09252133
Sep. 4, 2009 (GB) ................................ 0915485.7

(51) Int. Cl.
*H04B 11/00* (2006.01)
*G08C 23/02* (2006.01)
(52) U.S. Cl.
CPC ................ *H04B 11/00* (2013.01); *G08C 23/02* (2013.01)

(58) Field of Classification Search
CPC ........ H04B 11/00; H04B 13/00; H04R 17/00; H04R 17/005
USPC .................. 333/187, 189; 340/854.4; 367/82
See application file for complete search history.

(56) References Cited

U.S. PATENT DOCUMENTS 4,016,512 A * 4/1977 Wauk, II ...................... 333/143
4,215,426 A 7/1980 Klatt
(Continued)

FOREIGN PATENT DOCUMENTS

WO   WO 2008/075092 A1   6/2008

OTHER PUBLICATIONS

International Preliminary Report on Patentability and Written Opinion, dated Mar. 15, 2012 from related International Application No. PCT/GB2010/051470.
(Continued)

*Primary Examiner* — Luke Ratcliffe
*Assistant Examiner* — Hovhannes Baghdasaryan
(74) *Attorney, Agent, or Firm* — Scully, Scott, Murphy & Presser P.C.

(57) ABSTRACT

In apparatus for the acoustic transmission of power or data through a solid barrier such as a ships hull, assembly of an acoustic transducer to the hull is facilitated by bonding it first to an intermediate element by a thin layer of bonding adhesive and then bonding the intermediate element to the barrier using a second bonding layer. Acoustic matching of the transducer to the intermediate element is achieved by the thin layer, and the mechanically more robust base of the intermediate element can be rubbed on the barrier surface to displace or abrade away any unwanted debris or imperfections which might otherwise prevent the achievement of a thin second bonding layer. This makes the mounting and bonding process more tolerant of imperfections in the barrier surface due to either surface defects or particulate contamination. The transmit and receive transducers may be positioned relative to each other so as to suppress or attenuate multiple-transit signals. Thus the intermediate element may be wedge shaped to aid suppression of triple-transit signals. Transmit and receive transducers may have different wedge angles.

25 Claims, 6 Drawing Sheets

(56) References Cited

U.S. PATENT DOCUMENTS

| | | | | |
|---|---|---|---|---|
| 4,242,653 | A | * | 12/1980 | Moore .......................... 333/141 |
| 4,316,161 | A | * | 2/1982 | Moore et al. .................. 333/141 |
| 5,361,077 | A | * | 11/1994 | Weber .......................... 343/846 |
| 6,037,704 | A | | 3/2000 | Welle |
| 6,999,857 | B1 | | 2/2006 | Kasper et al. |
| 7,525,398 | B2 | * | 4/2009 | Nishimura et al. ........... 333/189 |
| 2004/0174095 | A1 | * | 9/2004 | Bhardwaj ..................... 310/334 |
| 2005/0000279 | A1 | * | 1/2005 | Yogeswaren .............. 73/152.58 |
| 2007/0170812 | A1 | * | 7/2007 | Fani et al. ..................... 310/311 |
| 2008/0194965 | A1 | * | 8/2008 | Sliwa et al. ................... 600/459 |
| 2008/0258841 | A1 | | 10/2008 | Sherrit et al. |
| 2009/0124959 | A1 | * | 5/2009 | Pelzer ............................ 604/22 |
| 2010/0061188 | A1 | * | 3/2010 | Bagshaw et al. ............. 367/137 |

OTHER PUBLICATIONS

Perdrix, M. et al., "Theoretical and experimental study of the influence of fluid layer coupling on the response of an ultrasonic broad band transducer", Journal of Physics D (Applied Physics) (Feb. 14, 1980), vol. 13, No. 2, pp. 185-194.

Son, Kyu Tak et al., "Generation of Surface Acoustic Waves for General Sensing Applications", IEEE Electronic Components and Technology Conference 2008 (May 2008), pp. 1690-1694.

International Search Report dated Oct. 20, 2010 issued in PCT/GB2010/051470.

Extended European Search Report dated Apr. 8, 2010 issued in EP 09 25 2133.

UK Search Report dated Dec. 10, 2009 issued in GB0915485.7.

Hobart E. et al., "Acoustic Modem Unit", *Oceans 2000 MTS/IEEE Conference and Exhibition* vol. 2, pp. 769-772 (Sep. 2000).

\* cited by examiner

ACOUSTIC TRANSMISSION

This invention relates to the acoustic transmission of energy through a solid barrier. The energy may be transmitted as such i.e. as a source of power, or it may be as a carrier for data; both are encompassed in at least one aspect of this invention. The invention can be useful in particular in the transmission of energy through the hulls of vessels especially submarines, or through the hulls of tanks and other armoured fighting vehicles, or through the walls of industrial structures such as pressure vessels. Many of these uses are characterised by it being undesirable to cut a hole in the solid barrier or otherwise to penetrate it to permit the passage of cables or other feed-throughs.

Various attempts have been made to provide signal communications through ship hulls without the need to penetrate the hull. Techniques used have included transmission of electrical signals or acoustic signals. In one known example of an acoustic technique, described in Hobart et al., "Acoustic Modem Unit", Oceans 2000 MTS/IEEE Conference and Exhibition, pp. 769-772, vol. 2, September 2000, piezoelectric transducers were used to generate acoustic signals for carrying low bit rate data through a ship's hull, suitable for conveying environmental data, e.g. sea temperature and salinity, from outside the hull without the need or the inconvenience of modifying the vessel by drilling holes in the hull. These data are typically transmitted at a low data rate, in a burst mode.

It is known to be desirable, in certain applications, to be able to supply electrical power wirelessly to an electrical device that is separated from the power supply by an intervening barrier. For example, it is known from U.S. Pat. No. 6,999,857 to supply energy to a low power micro-electronic mechanical systems (MEMS) sensor device through an intervening dielectric material by transmitting electromagnetic waves, e.g. microwaves, through the material and for the device to derive electrical power from the received electromagnetic waves.

It is also known, from U.S. Pat. No. 4,215,426 to Klatt, to transfer electrical power through a high-pressure fluid medium using an intermediate acoustic pressure wave. An electrically powered acoustic wave generator transmits acoustic waves through the high-pressure fluid being pumped through a drill pipe. A mechanical acoustic rectifier is activated by the acoustic pressure waves and drives a turbine generator to generate electrical power for use by devices deployed in the drill pipe. This system employs only low frequency acoustic waves in order to minimise the attenuation of the transmitted acoustic waves in the fluid medium.

However, the acoustic energy transmission technique of Klatt is unworkable with a solid medium.

Our earlier international patent application, published as WO2008/075092, discloses techniques for transferring high bandwidth acoustic signals through a solid barrier, for example through the hull of a ship or a submarine. Another of our patent applications discloses methods of transferring power acoustically through a solid barrier. The present application in its various aspects is directed to improvements in or related to the inventions of those applications.

We have found that the successful fitting of acoustic transducers directly to the surface of a ship's or submarine's hull or other barrier requires a very high degree of cleanliness and a smooth surface finish if the coupling of acoustic energy across the transducer/hull interface is to be within specification. These requirements become particularly stringent if the acoustic impedance of a bond layer used to attach the transducer to the barrier differs greatly from that of the barrier. Out of tolerance bond layer thicknesses can seriously degrade the coupling of energy across the interface at preferred operating frequencies and in the case of data transfer can also reduce the available bandwidth.

The achievement of the required cleanliness and surface finish is difficult in a ship-building environment when constructing a new vessel, and even more so when retrofitting a new system to an existing vessel, the hull of which will have previously been painted and may also have suffered surface corrosion. A further problem is that in the event that any large particles or debris are trapped in the bond layer, the resulting thickness of the bond layer will be out of tolerance over at least a portion of its area and this will not be discovered until after the transducer bond has been cured and the transducer then electrically tested.

In a first aspect, the present invention can provide a manufacturing method in which these difficulties can be reduced.

Thus, this first aspect of the present invention provides a method of fitting an acoustic transducer to a solid barrier substrate comprising bonding an active transducer element to an intermediate element and then bonding the intermediate element to the substrate by means of a second bonding layer. This enables the active transducer to be bonded to the intermediate element under clean-room conditions, such that an extremely thin layer of bonding adhesive may be employed as discussed later. The bonding of the intermediate element to the substrate may be effected in a manner which can be more tolerant of surface imperfections and airborne dust or other debris present on the jointing surfaces. In addition the intermediate element, which can be made mechanically robust compared to a typically fragile transducer platelet, can be ground (mechanically rubbed) on the substrate either to displace out or to grind down any residual particulate contamination in at least the part of the bonding layer through which acoustic signals are transmitted. Thus, whilst locally filtering the air whilst bonding the intermediate element to the substrate may be advantageous, clean-room conditions generally will not be necessary.

In particular the active transducer element may be bonded to a first face of the intermediate element and the intermediate surface may be bonded to an opposite face of the intermediate element.

The intermediate element will be generally referred to, in the detailed description of preferred embodiments that follows, as a "carrier plate".

Advantageously, the process of grinding down contaminant particulate matter is assisted if the otherwise smooth bonding surface on the barrier or the carrier plate has shallow residual machining grooves into which unwanted particles can lodge. Such grooves may be deliberately applied or they may occur as suggested as a by-product of a machining process used to form the surface of the substrate and/or the carrier plate. Small particles will sit within the grooves; larger particles will lodge and being unable to roll will be more easily ground down. Preferably, the surface area occupied by grooves is no more than 10% of the bonded transducer face. In a further advantage, such grooves also facilitate the flow of adhesive out of the critical surface to produce the desired thin bond layer through which sound is transmitted from the transducer into the substrate.

Preferably, the method further comprises monitoring a signal passing to or from the transducer whilst the intermediate element is being bonded to the substrate, the signal being indicative of the thickness of the second bonding layer and/or the position and/or orientation of the transducer.

Thus it becomes practical to monitor the wringing down of the assembly onto the barrier by observing in real time the signal response to confirm that a sufficiently thin albeit uncured second bonding layer has been achieved, and that the transducers on the two sides of the barrier are correctly aligned one to the other across the barrier before the bond of the second transducer assembly to the barrier has solidified.

This aspect of the invention also provides apparatus for the transmission of an acoustic signal through a solid rigid substrate comprising:

a first acoustic transducer for converting electrical signals into acoustic signals, the transducer being mounted on a first face of a solid rigid substrate to transmit the acoustic signals into the substrate;

a second acoustic transducer mounted on a second face of the substrate so as to receive acoustic signals emitted by the first acoustic transducer and to convert the acoustic signals into electrical signals;

and characterised in that at least one of the transducers is mounted on its respective face of the substrate via an intermediate element, the transducer being bonded by a first bonding layer to the element, and the element being bonded to the substrate by a second bonding layer. The optimal thickness of the second bonding layer is dependent on the primary role of the link. For a data transmission link where the presence of triple transit spurious signals may limit the data transmission performance, increased reflection losses at each bond layer onto the barrier when these bonds are not 'acoustically thin' will improve the spurious signal free dynamic range, particularly if the signals reflected off the two barrier bond layers subsequently miss the 'receiver' transducer. For a power transmission link, such losses would need to be minimised by making the bond layer acoustically thin. However, if as a consequence there is significant ripple in the transmission response of a power transmission link, then the frequency of signal transmission should ideally be locked to a peak in the transmission response caused by triple transit signals. The reflectivity of a bond layer is a function of the acoustic impedance mismatch between the barrier (and intermediate element) and the bond materials as described later below. For the specific case of a data link using a bond performed with Masterbond EP30 between the intermediate element and the barrier, both using the same type of high tensile NQ1 steel for example, the bond to the barrier may typically be at least twice the thickness of the first bonding layer.

As explained hereinafter, the thickness of the second bonding layer may be chosen to facilitate the passage of acoustic signals of a predetermined frequency and/or bandwidth. That is to say, the thickness of the second bonding layer is configured to enable a controlled modification of the signal transmission response across the second bonding layer as a function of frequency. For instance, the thickness of the second bonding layer may render the second bonding layer acoustically transparent to acoustic signals of a predetermined frequency and/or bandwidth thereby promoting the passage of acoustic signals of the predetermined frequency and/or bandwidth whilst promoting the attenuation of other acoustic signals.

The second bonding layer may contain spacers to define its thickness.

The carrier plate may have a grooved or otherwise profiled surface to which the second bonding layer is attached, to accommodate debris present between the face of the substrate and the carrier plate during bonding thereof.

The carrier plate preferably is of a material which has an acoustic impedance which is the same as or similar to that of the substrate.

Thus it may be of the same material as the substrate.

This aspect of the invention is useful when the apparatus is intended for power transmission. Thus the first and second transducers may be configured respectively to convert and transmit and to receive and convert electrical power via the acoustic signals.

Then the second bonding layer, and in particular its thickness, may be chosen to minimise reflection losses at the bond layer at the nominal frequency for power transmission across the barrier. Accordingly, reflection losses may be minimised by making the second bonding layer an integer multiple of acoustic half-wavelengths thick. At an optimal nominal frequency for power transmission the single transit signals and triple transit signals received by the second transducer are in phase.

This aspect of the invention may also be used for data transfer apparatus. Thus the electrical signals may be modulated with data, the first transducer being configured to transmit the data as data-modulated acoustic signals, the second transducer being configured to receive said signals.

Then the thickness of the second bonding layer may be chosen so that at a nominal frequency of the data-modulated acoustic signals, triple transit signals in the substrate are substantially attenuated due to reflection losses at each of the barrier bond interfaces, any reflected signals being deflected so as to miss the signal receiving transducer.

When the apparatus is configured for data transfer, important considerations are signal bandwidth through the barrier and an ability to reject spurious signals. The first aspect of the present invention can enable the thickness of the bond between the carrier plate and the transducer platelet to be reduced. This enables the centre-frequency of the data link (and with it the bandwidth) to be increased. For example, if the bond is made less than 0.5 µm (microns) thick for the specific case of a low acoustic impedance adhesive bond such as for example Masterbond's EP30 which as an acoustic impedance of approximately $2 \times 10^6$ kg/m$^2$/s, this will permit an acoustic centre frequency of 40 MHz. This adhesive has a low acoustic impedance compared with most barrier materials on account of both its low density (~1.2 grams/cc) and low Young's Modulus which in turn yields a low acoustic velocity of ~1645 m/s (calculated value). A bond line of 0.5 µm (microns) is easily achievable under clean room conditions. The maximum thickness of the relevant part of the second bonding layer between the carrier plate and the substrate then needs to be of similar thickness, otherwise reflection losses at the acoustic boundary start to become excessive. This can be achieved without resort to clean-room conditions by the use of a carrier plate having a grooved or profiled surface as mentioned above, which enables minimisation of the local thickness of the second bonding layer where the acoustic signals pass through it to the other transducer, whilst tolerating considerably greater thickness elsewhere in the layer where the acoustic signals do not pass. For example this has been experimentally demonstrated using a 'tripod' geometry of pads, all lapped flat to a common plane. One pad encloses the sound channel, while the role of the other two pads on the base of the carrier plate is to provide mechanical stability so that the sound channel pad naturally sits parallel to the flat barrier thus minimising the thickness of the adhesive bond.

It is in addition beneficial for the smooth bonding surface of the substrate to contain a low density (typically less than 10% by area) of shallow (1 to 10 µm) channels to facilitate the flow of adhesive out of the critical surface between the carrier plate and the substrate in the region beneath the transducer platelet.

The thickness of the bonding layer between the carrier plate and the substrate may be chosen partially to compensate for a reduction in the pass band response of the apparatus as a function of increasing frequency due to for example the increase in acoustic attenuation with frequency. However the frequency bandwidth over which signal transmission equalisation is achieved is a function of both the acoustic mismatch between the bond layer and the substrate, and the thickness of the barrier substrate and for a single layer structure will not exceed 1 octave of bandwidth, an octave being equivalent to a 2 fold increase in frequency from the lowest frequency to the uppermost frequency.

The rejection of spurious signals is an advantage provided by preferred embodiments of a second aspect of the invention, according to which there is provided an apparatus for the transmission of data-bearing acoustic signals through a solid rigid substrate comprising:

a first acoustic transducer for converting data-bearing electrical signals into data-bearing acoustic signals, the transducer being mounted on a first face of a solid rigid substrate to transmit the acoustic signals into the substrate;

a second acoustic transducer mounted on a second face of the substrate so as to receive the acoustic signals emitted by the first acoustic transducer and to convert the acoustic signals into data-bearing electrical signals; and characterised in that the transducers are positioned relative to each other and/or to the substrate such that multiple-transit acoustic signals propagating between said transducers are effectively suppressed.

The apparatus may comprise an intermediate element disposed between a said transducer and the face of the substrate on which it is mounted, the intermediate element being shaped to suppress resonant acoustic reflections between the transducer and the said face of the substrate.

This aspect of the invention may be implemented using apparatus in accordance with the first aspect of the invention.

Preferably the boresights of the transducers are oriented so that they point in directions that are slightly offset, one relative to the other, rather than being substantially parallel to one another. The inventors have found that if the bore-sights are not parallel then a modest improvement of a 'few' dB in spurious free dynamic range may be achieved at certain frequencies. Thus the boresights may be inclined to each other at an angle such that a said multiple-transit signal incident on the second transducer has a phase variation across the transducer such that electrical signals induced in the transducer by said signal are attenuated by varying degrees as a function of frequency due to mutual interference.

Alternatively or in addition the relative angular inclination of non-parallel boresights may be such that a multiple-transit signal falls outside a field of view of the second transducer.

The interface may be provided by a wedge of material disposed between an active element of the transducer and the face of the substrate on which the transducer is mounted.

The aforesaid intermediate element may be wedge-shaped. Each transducer assembly may comprise a said wedge. The wedges of the two transducer assemblies may have the same angle of taper. The transducer assemblies may be disposed on the substrate so that the tapered ends of the wedges point in opposite directions. Alternatively, the wedges may have different angles of taper. However the difference between the angles of taper must be less than the angular field of view of the transducers for incoming acoustic waves.

The invention now will be described merely by way of example with reference to the accompanying drawings wherein.

Submarine hulls need to be able to withstand considerable stresses in use. Every penetration point in the hull is a potential point of failure. Moreover, these penetrations are expensive to manufacture and to install. Designers of other types of enclosed structure, for example pressure vessels in nuclear reactors and other steam-raising plant, chemical plant, and high pressure pipelines, share similar concerns. There is frequently a need to be able to convey data, e.g. pressure, temperature, radiation, chemical monitoring data and video from sensors, between the inside of such an enclosed structure and the outside. A high bandwidth communications technique for transferring such data that avoids the need to physically penetrate the structure brings considerable advantages in the overall integrity and reliability of the structure.

Figure 1:
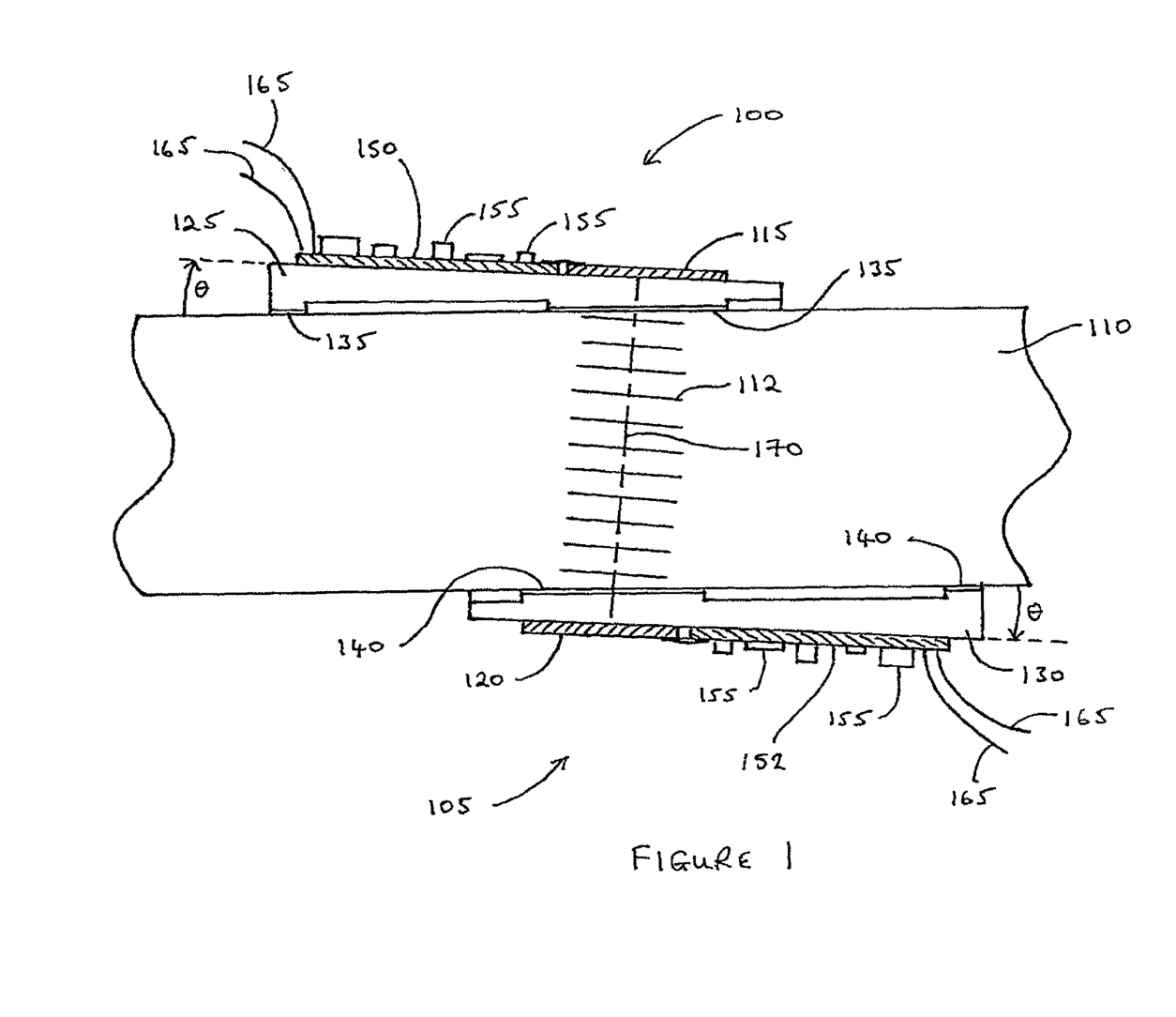
FIG. 1 is a side view of section of a solid substrate with transducers fitted according to a preferred embodiment of the present invention.
Figure 2:
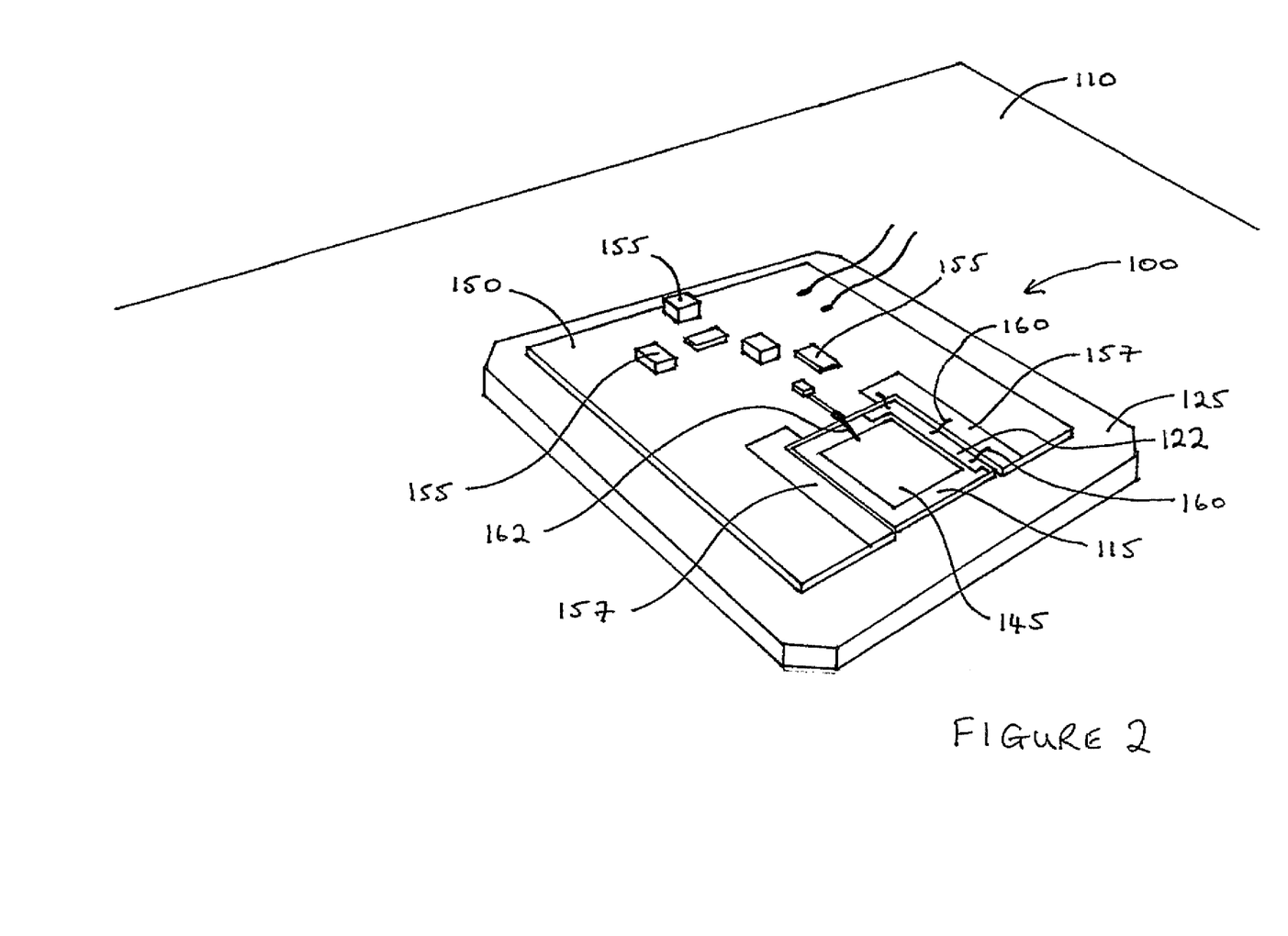
FIG. 2 is a perspective view from one side of the solid substrate in the embodiment shown in FIG. 1, showing details of one of the transducers.

Referring to FIG. 1 and to FIG. 2, a sectional view and a perspective view respectively (not drawn to scale) are provided to illustrate an electro-acoustic transducer installation according to a first preferred embodiment of the present invention. The installation comprises piezoelectric transducer assemblies 100 and 105 that have been aligned and bonded to opposite faces of a solid substrate 110, which may be a submarine hull, wall of a pressure vessel or other solid barrier including further examples mentioned above, to communicate data and or power through the substrate 110 using high frequency acoustic signals 112, preferably in the frequency range 1-100 MHz or higher. Each transducer assembly 100, 105 incorporates a transducer 115, 120 comprising a square platelet of a piezoelectric material such as lithium niobate, approximately 10 mm by 10 mm and approximately 100 µm thick, that has been bonded to a similarly sized ground plane electrode, not shown in FIG. 1. A portion 122 of the ground plane electrode wraps around one edge of the transducer 115 as shown in FIG. 2 to provide a convenient surface for making an electrical connection. The ground plane electrode of the transducer 115 has in turn, been bonded by means of a first bonding layer to a slightly wedge-sectioned carrier plate 125, 130—to be described in more detail below and made, preferably, from the same material as the solid substrate 110 so that there is no acoustic impedance discontinuity between the carrier plate 125, 130 and the substrate 110 which, even in the absence of a bond layer, would give rise to acoustic reflections. The carrier plate 125, 130 provides in particular a robust mounting surface for the more delicate piezo-electric transducer 115, 120.

The carrier plate 125, 130 is bonded to the surface of the solid substrate 110 by means of a second bonding layer 135, 140. The preferred thickness of the first and second bonding layers, in units of acoustic wavelengths, is a function of the acoustic impedances ($Z=\rho V$) of the transducer, bond and substrate layers. Bonding layer thicknesses will be discussed in more detail below but, by way of illustration, for a preferred example of a 36° Y cut lithium niobate transducer 115, 120 bonded to a sample of NQ1 high tensile naval steel 110 with an "EP30" epoxy manufactured by Masterbond Inc., the first and second bond layer thickness should be less than one eightieth of an acoustic wavelength. For a preferred 40 MHz centre frequency of acoustic signals to be generated by the transducers 115, 120, the preferred bond layer thickness is less than approximately 0.5 µm.

Each transducer 115, 120 further comprises and is activated by means of an electrode 145 that has an area of approximately 49 mm². The electrode 145 is located on the opposite face of the transducer platelet 115 to that of its ground plane electrode by which it is bonded to the carrier plate 125. The electrode 145 is positioned centrally on the transducer 115, leaving a gap between the electrode 145 and the wrap-around portion 122 of the ground plane electrode.

An interfacing circuit board 150, 152 is provided, based upon conventional printed circuit board (PCB) technology, which carries interfacing components 155, for example inductors and capacitors for an impedance matching network to be described below. The circuit board 150, 152 is attached to the same surface of the carrier plate 125, 130 as the transducer 115 so as to be substantially coplanar with the transducer 115. A portion of the circuit board 150, 152 slightly larger in size than the transducer 115 is cut out to leave an aperture so that when attached to the carrier plate 125, the circuit board at least partially surrounds the transducer 115, leaving a small gap between respective adjacent edges. In the particular example shown in FIG. 1 and FIG. 2, the circuit board 150, 152 encloses the transducer 115, 120 on three sides only, but alternatively the circuit board 150, 152 may be provided with a hole to completely surround the transducer 115, 120 when attached to the carrier plate 125, 130.

The circuit board 150, 152 has a conventional ground plane layer (not shown in the figures) provided on one side and a pattern of conventional conducting tracks (also not shown in the figures) interconnecting the surface-mounted components 155 on the other. As shown in FIG. 2, a portion 157 of the ground plane layer of the circuit board 150 wraps around the edges of the circuit board 150 within the aperture to provide a convenient conducting surface for electrically connecting, using thin metal bonding strips 160, the wrap-around portion 122 of the ground plane layer of the transducer 115 to the wrap-around portion 157 of the ground plane of the circuit board 150. A further metal bonding strip 162 connects the electrode 145 to interfacing components 155 of the interfacing circuit board 150, 152. The metal strips 160, 162 are chosen to be as thin a possible to minimise the coupling of mechanical energy from the transducer platelet 115 while having sufficient current handling capability for the intended applications of the transducer arrangement. The interfacing circuit board 150, 152 also provides an electrical connection, represented symbolically by interconnecting wires 165 in FIG. 1 and FIG. 2, for connecting to a source of signals to be transmitted through the solid substrate 110 and/or a receiver of such signals.

Preferably, the interfacing circuit board 150, 152 is mounted on the carrier plate 125, 130 by means of an appropriate bonding layer between the ground plane layer of the circuit board 150, 152 and the carrier plate 125, 130. The properties of this bonding layer are not as significant as those of the first or second bonding layers as regards the acoustic properties of the transducer assembly 100, 105. However, this bonding layer should be formed by an electrically conductive material in order to provide an electrical connection between the earth plane of the circuit board 150, 152 and the carrier plate 125, 130. Such a connection can tend to suppress electrical crosstalk. A thicker layer of adhesive between the carrier plate 125, 130 and the substrate 110 will yield a higher level of reflection at this interface and hence higher overall insertion loss. If the reflected signals are not resonant with the transducers 115, 120 (due to the wedging of the carrier plates 125, 130), then the frequency emission/detection characteristics of the transducers 115, 120 will not be impacted upon. However if the adhesive layer is thick, then acoustic resonances may be set up between the two parallel faces of the substrate 110, and these will become significant if the acoustic attenuation losses of the substrate 110 do not suppress those resonances. If the mechanical resonance signals are subsequently incident on the transducer 115, 120 (because the wedge angle of the carrier plate 125, 130 high enough) then a ripple in the transmitted signal as a function of frequency will be observed. This ripple will however be partly suppressed because the acoustic waves associated with the resonant echoes between the two surfaces of the substrate 110 will be outside the primary acceptance lobe for the transducer 115, 120 (a diffraction-related property).

In a preferred demonstration apparatus according to this first preferred embodiment, the transducer installation represented in FIG. 1 is designed to provide a frequency bandwidth of 15 MHz centred on 40 MHz for communicating data through a sample of NQ1 high tensile naval steel approximately 35 mm thick using acoustic signals. In particular, a 15 MHz overlapping frequency band (variations in practical implementation lead to non-identical centre frequencies for the two transducers 115, 120 and hence "overlapping" refers to the frequency span that is coincident between the two transducers) for the two transducer assemblies 100, 105 was selected over which the electrical return loss was better than 2:1 VSWR (Voltage Standing Wave Ratio) and the 15 MHz frequency band was found to be sufficient to communicate analogue PAL signals from a camera through the steel barrier 110. However the inventors have also transmitted data through the same installation using a COFDM modulation scheme in which digital signals have been transmitted over a much wider bandwidth spanning ~12 MHz to ~57 MHz.

The relative dimensions of the transducer assemblies 100, 105, and in particular of the transducers 115, 120 and the steel sample 110, have been exaggerated in FIG. 1 to more clearly show the structure of the transducer assemblies 100, 105. In a scale drawing, the transducers 115, 120, in particular, would appear significantly smaller and thinner in comparison with the thickness of the steel or other barrier 110 in a typical application.

In our earlier application we recommended that the positioning of the transducers 115, 120 on opposed sides of the substrate 110 when using 49 mm² square electrodes 145, should be such that the transducer boresights 170 are coincident and aligned to within approximately ±1° for the receiving transducer response to lie within the 3 dB points of the modelled transducer response. In practice, alignment hitherto has been achieved with some difficulty by the transducer assemblies 100, 105 being positioned by geometrical measurement on each side of the substrate 110.

Very thin bonding layers, preferably less that $\frac{1}{100}$ of an acoustic wavelength thick, are desirable when the acoustic impedance of the bonding layer, defined by the product of the acoustic velocity in the layer and the density of the layer, is very different from that of either the solid substrate 110 or the transducer platelet 115, 120. These very thin bonding layers reduce the acoustic mis-match which would otherwise occur across the interfaces between the adhesive and the surfaces which it bonds together, due to the acoustic impedance of the adhesive being much less than that of the transducer platelet material or that of the carrier plates 125, 130. Otherwise the performance of the transducer assembly 100, 105 would be dominated by reflections at the interfaces between the adhesive and the transducer. Such reflections would produce a highly resonant structure with a high Q, and thus a narrow-band response.

To facilitate the achievement of a thin uniform first bond layer between the transducer ground plane electrode and the carrier plate 125, 130, a loading force equivalent to ~7 Kg/cm² is applied uniformly using a resilient pad over the active electrode 145 of the transducer 115, 120 during the curing cycle to ensure the applied adhesive squeezes out of the interface between the ground plane electrode of the transducer 115, 120 and the carrier plate 125, 130 to produce a thin bond line when cured.

Making the second bond layer 135, 140 as thin as possible minimises transmission losses due to reflections at the bond layer 135, 140 and so from a practical perspective should be preferably of a similar thickness to that of the first bond layer.

Making the second bond layer 135, 140 thicker in a controlled manner may, in combination with sufficient angle of wedging of the carrier plate 125, 130 be used to suppress triple transit spurious signals in a data link application of the transducer arrangement. For a power transmission link application, triple transit signal suppression is less of a requirement provided the frequency of transmission can be tuned to lock into a peak in the transmission response ripple caused by triple transit signals to maximise power transmission.

Making the second bond layer approximately λ/2 thick at a given frequency of operation and selecting an appropriate material may be used to provide band-shape flattening to compensate for example for increasing acoustic losses at higher frequencies.

The reflectance of acoustic power normally incident on a bond layer interface between two substrates is given by the following formula:

$$R_{bond} = \frac{(Z_{bond} - Z_1)^2}{(Z_{bond} + Z_1)^2}$$

where the acoustic impedance $Z_{bond}$ arising from the finite thickness L of the bond layer, valid for low levels of acoustic attenuation within the bond layer, is given by:

$$Z_{bond} = Z_2 \left\{ \frac{Z_3 \cos(k_2 L) - i Z_1 \sin(k_2 L)}{Z_2 \cos(k_2 L) + i Z_3 \sin(k_2 L)} \right\}$$

Here $Z_1$ and $Z_3$ are the acoustic impedances for substrates 1 and 3, respectively, on both sides of the bonding layer, $Z_2$ is the acoustic impedance of the bond layer of thickness L, while $k_2$ is the acoustic vector $2\pi/\lambda$, for an acoustic beam of wavelength λ within the bond layer.

The reflection of acoustic power by an adhesive bond layer is thus a function of the thickness L of the bond layer and the mismatch between the impedance of the substrate relative to that of the adhesive bond layer. For the specific case of a Masterbond EP30 adhesive bond layer of thickness Λ/100 (equivalent to approximately 0.5 μm at 40 MHz), bonding two pieces of NQ1 high tensile naval steel, ~34% of the incident power is reflected by the adhesive interface. If the bond layer thickness is further reduced to ~Λ/200 then the reflected power losses fall to 11.6%. If the acoustic impedance of the bond layer was for example only a factor of ~2.7 smaller than that of the NQ1 steel, for example if a preferred indium metal was used as the second bonding layer 135, 140 then the predicted reflection losses would be much smaller, for example 0.2% for a ~Λ/100 (equivalent to approximately 0.6 μm at 40 MHz) thick layer and ~16.3% for a ~Λ/10 thick layer.

In FIG. 1, the ground planes of the transducers 115, 120 are bonded by a very thin first bonding layer of Masterbond EP30 adhesive to the wedge-shaped carrier plate 125, 130, which in turn is bonded to the solid substrate 110 by a second bonding layer 135, 140 of Masterbond EP30 adhesive. The carrier plates 125, 130 are of the same material (in this specific example—NQ1 steel) as the solid substrate 110. Each wedge-shaped carrier plate 125, 130 has an included angle of taper θ. The minimum value of the angle θ is determined by the choice of frequency of operation and the materials selected. The angle θ in this case should exceed 0.5°, and in this example it is 1.8° for both carrier plates 125, 130. If the angle θ is too small, then an undesirable level of ripple will be generated in the transmitted signal due to acoustic interference between multiple reflections which occur between opposite surfaces of the carrier plate then falling within the angular field of view of the receiving transducer.

Figure 3:
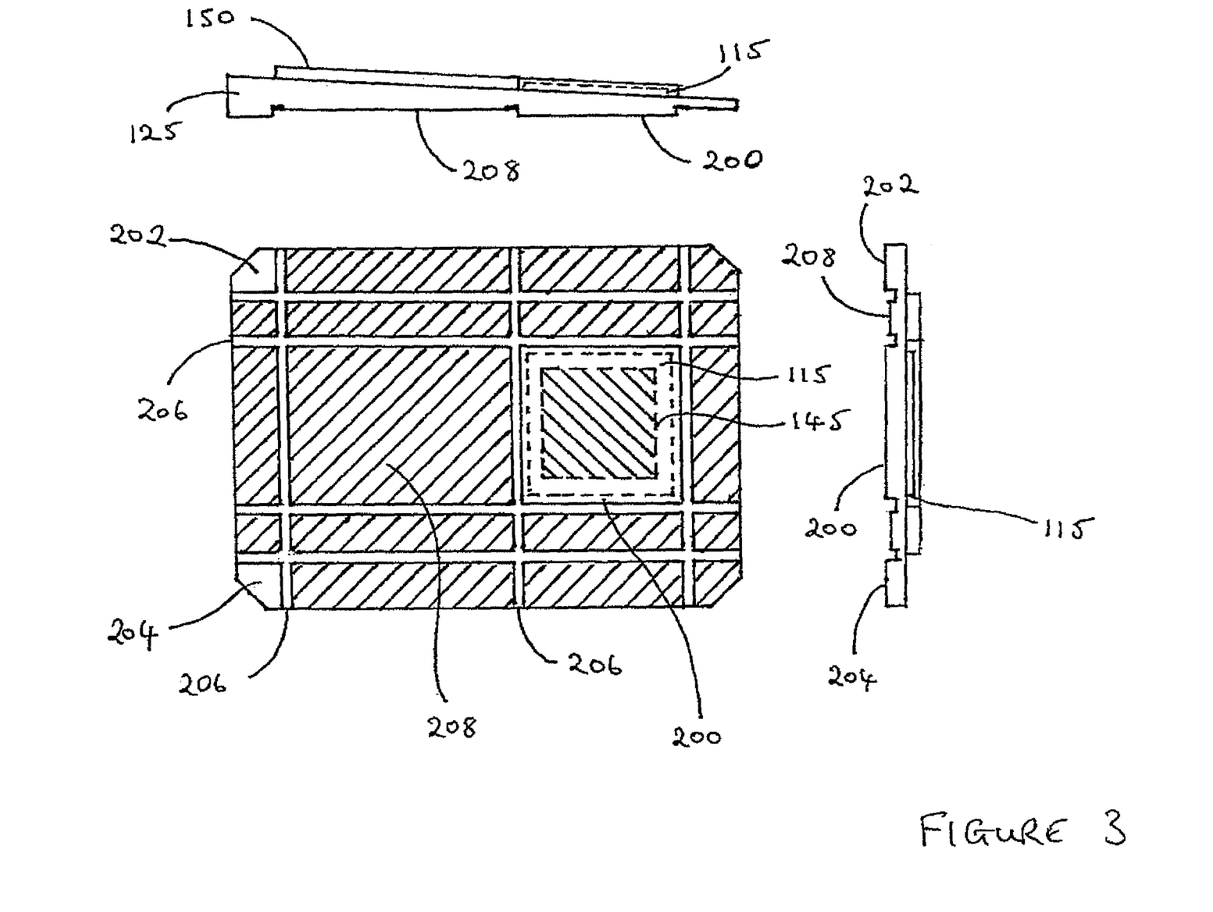
FIG. 3 shows a preferred structure of the intermediate layer (carrier plate)

FIG. 3 shows a preferred design for the carrier plate 125, 130 which helps to facilitate the achievement, on-site, of the thin second bonding layer 135, 140 between the carrier plate 125, 130 and the solid substrate 110. This assumes that each transducer assembly 100, 105 is already assembled and ready to be bonded to a given substrate 110. In this figure, parts already described in FIG. 1 and FIG. 2 carry the same reference numerals.

The surface of the carrier plate 125 which faces towards a solid substrate 110 when mounted thereon, consists of three separate pads which together form a three point contact when the carrier plate 125 is mounted on the substrate 110. The largest pad 200, located directly below the bonded transducer 115, is 12 mm square and provides the channel through which acoustic waves are transmitted. The other two pads, 202, and 204 each of maximum dimensions 4.5×4.5 mm, are purely structural. Their role is to ensure that the plane of the largest pad 200 will naturally lie nominally parallel to that of the flat mounting surface on the solid substrate 110. The majority of the remaining exposed surface 208 of the carrier plate 125 (all of that area, other than the area 200, shown hatched in FIG. 3) facing towards the hull is machined away to a depth of nominally 100 μm. This ensures that any minor curvature (of the order of a few microns departure from planarity) in the overall footprint of either the carrier plate or hull does not prevent a bond layer thickness of 0.5 μm or less being achieved between the pads 200, 202, 204 and the hull 110, while allowing the ~100 μm adhesive bond layer between the remainder of the carrier plate bottom surface and the hull to contribute to the overall mechanical strength of the bond.

Before the surface 208 is machined away, each of the interior edges of the pads 200, 202, 204 are defined by grooves 206 (500 μm deep and 2 mm wide within example) cut into the surface. The entire surface including the pads is then lapped to a surface finish of better than 0.2 μm Ra. The unwanted portions 208 of the surface are then cut away. The machined grooves 206 enable the unwanted surface 208 to be machined away without the machine cutter needing to touch the edges of the mounting pads 200, 202, 204 which might otherwise produce burrs on their edges. This sequence of operations enables the critical mounting pads 200, 202, 204 to be made smooth to better than 0.2 μm Ra using standard processes and free from any dents, burrs or, for the most critical pad 200, any edge turn down defects on the lapped mounting surface.

The transducer platelets 100, 105 are first bonded to the carrier plates 125, 130 under clean-room conditions so that a thin adhesive layer of no more than 0.5 μm thickness can be achieved. Then the internal and external locations on the solid substrate 110 are prepared to receive the transducers by being cleaned back to bare metal, machined flat to better than 2 μm over the entire footprint of the carrier plates and lapped to a surface finish of better than 0.2 μm R$_a$ in a locally-filtered atmosphere.

Adhesive is then applied to the prepared and cleaned surfaces on opposite faces of the substrate, 110, and the bottom surfaces of the carrier plates 125, 130 are then pressed in to the uncured adhesive and bedded down so that the boresights 170 of the transducers are coincident. Grinding the carrier plates 125, 130 against their substrate surfaces during bedding-down drives any residual debris into the relieved (machined-away) parts 208 of the surface, allowing the thin 0.5 μm bond layer to become established between the surface 200, 202, 204 of each carrier plate and the prepared substrate. The grooves 206 collect any residual debris present between surfaces being bonded of size greater than 100 μm, and ensure that the bonding layers 135, 140 can be compressed down to the thickness required. As before a loading force centred above the transducer pad 200 is applied to ensure the applied adhesive squeezes out of the interface during the curing cycle to produce a thin bond line.

The correct relative alignment of the transducers 115, 120 is achieved by first fixing one of the transducer assemblies 100, 105 to the substrate 110 as described. Then both transducer assemblies 100, 105 are powered-up, one to transmit and the other to receive a test signal through the substrate 110. The second transducer assembly 105, 100 is then fitted to the substrate 110 and, before the adhesive has cured, it is manoeuvred on the substrate surface until the received test signal is at a maximum. The transducer boresights 170 are then coincident. Alternatively, if both transducer assemblies 100, 105 are fitted and manoeuvred simultaneously, it then is possible to ensure that the monitored signal has at least a minimum absolute value. When this is achieved, it indicates additionally that the thickness of the second bond layers 135, 140 have been compressed or extruded down to the required values of thickness. The acoustic beam launched by the preferred 10×10 mm transducers at the preferred operating frequency of 40 MHz is highly directional. For the specific case of NQ1 naval steel which has an acoustic velocity of approximately 5900 m/s, the 'Rayleigh distance' over which the 40 MHz beam remains nominally collimated is approximately 330 mm before acoustic diffraction starts to become significant. Nevertheless, by operating the transducer initially at lower frequencies, very low amplitude signals can be detected even when the transducer platelets 115, 120 are misaligned by several 10's of mm, and used to peak up the co-alignment of the bore-sights 170 of the two transducers. This alignment can then be further optimised by increasing the frequency of the monitoring signal.

Referring in particular to FIG. 1, the wedge-shaped carrier plates 125, 130 suppress the build up of resonant signals echoing between the opposite faces of the carrier plate which would otherwise produce unwanted ripple in the transmission response of a data link. Taking transducer assembly 100 as an example, the wedge-shape of the carrier plate 125 results in the acoustic path length between the transducer 115 and the surface of the substrate 110 varying from one side 152 of the transducer surface to the other side 154. Thus multiple reflections between the transducer and the adjacent substrate surface will not give rise to a resonant interference analogous to the optical interference seen in a Fabry-Perot Etalon.

The same effects arise for wavefronts which have passed through the substrate 110 and arrive at the transducer assembly 105: reflected waves again encounter differing path lengths through the wedged carrier plate 130. Thus the coherence of reflected wave fronts necessary for resonance to become established is prevented.

The FIG. 3 embodiment may be modified to provide considerably thicker second bonding layers 135, 140 of defined thickness by including micro-spheres within the adhesive mix to ensure that the surface of the wedged carrier plate 125, 130 is stood-off from the substrate surface by the required distance. This feature can be employed to provide controlled suppression of triple-transit signals, and is most effective for data links having a fractional bandwidth that is significantly less than an octave of the centre frequency. Multiple-transit (especially triple-transit signals which have been reflected back and forth once through the substrate 110 between the transducers) are the most important source of spurious signals that limits the bandwidth and performance of the data link. For example, if the adhesive second bonding layers 135, 140 are made approximately 0.8 μm thick (approximately λ/50 at 40 MHz, assuming an acoustic velocity of 1645 m/s in the adhesive), then for a substrate 110 and carrier plates 125, 130 made from NQ1 steel, the reflection loss per transit through the second bonding layer 135, 140 will be approximately 4.7 dB at 40 MHz. If the adhesive bonding layer responsible for these reflection losses is not parallel to the plane of the transducer 115, 120, and the angle of acoustic incidence is made sufficiently large, then the multiple transit signals reflected off these adhesive bonding layers will 'walk off' and miss the receiving transducer 120, 115 altogether. However, multipath acoustic reflections arising from reflections off the transducer interfaces on each side of the substrate through which data is being transmitted will remain. Under these circumstances the use of wedged carrier plates 125, 130 with substrate-to-carrier plate second adhesive bond layer thicknesses of 0.8 μm will yield a net additional suppression of the triple transit signal relative to the main signal of 9.4 dB at the nominal preferred frequency of 40 MHz. This suppression contribution to the triple transit spurious signal level is in addition to other contributions to triple transit suppression arising from other sources such as for example the higher level of acoustic attenuation encountered by triple transit signals, or efficient electro-mechanical coupling of acoustic power out of the 'acoustic cavity' and into either the receiver or transmitter transducers.

A controlled thickness of the bonding layers 135, 140 may also assist in reducing the variation of pass band response with frequency due to the increase of acoustic attenuation in the barrier with frequency. Such attenuation in dB/unit length can typically increase by as much as the square of the acoustic frequency. For example if the second bonding layer thickness is set to be half an acoustic wavelength thick at 80 MHz then the layer will be maximally reflective at a frequency of 40 MHz, but substantially transparent at a frequency of 80 MHz. However the level of reflectivity at 40 MHz and impact on the variation of pass band response with frequency will be a strong function of the acoustic impedance mismatch between the bond material used, and those of the substrate and carrier plate materials. For example if a 20.6 μm thick layer of Masterbond EP30 adhesive was used between two pieces of NQ1 steel, signal transmission through the second bond layer at 40 MHz would be suppressed by approximately 21 dB, but if a 28.9 μm thick layer of Indium metal was used (again equivalent to λ/2 thick at 40 MHz), the level of suppression would be much smaller at approximately 3.7 dB. Thus it can be seen that a suitable choice of bonding material and thickness for the layers 135, 140 can be used to compensate partially for the increasing attenuation with frequency of the acoustic signals by the substrate material. The choice of bond material ideally needs to be selected to yield an acoustic impedance mismatch that is tailored to give the optimal slope to compensate for the observed change in signal transmission with frequency due to other causes such as for example acoustic attenuation or diffractive spreading.

In many ways, indium is far superior to an adhesive bond. Indeed metallic rather than adhesive bonds are potentially an important way forward for this technology provided they can be made effectively. Being conductive, there is no need to deposit wrap around electrical ground plane contacts 122 onto to the sides of the transducer platelets 115, 120 so as to make contact to the electrical ground plane electrode of the transducer which is elsewhere bonded intimately to the substrate. Furthermore, Indium is acoustically much better matched to both most metal barriers and lithium niobate transducers.

Figure 4:
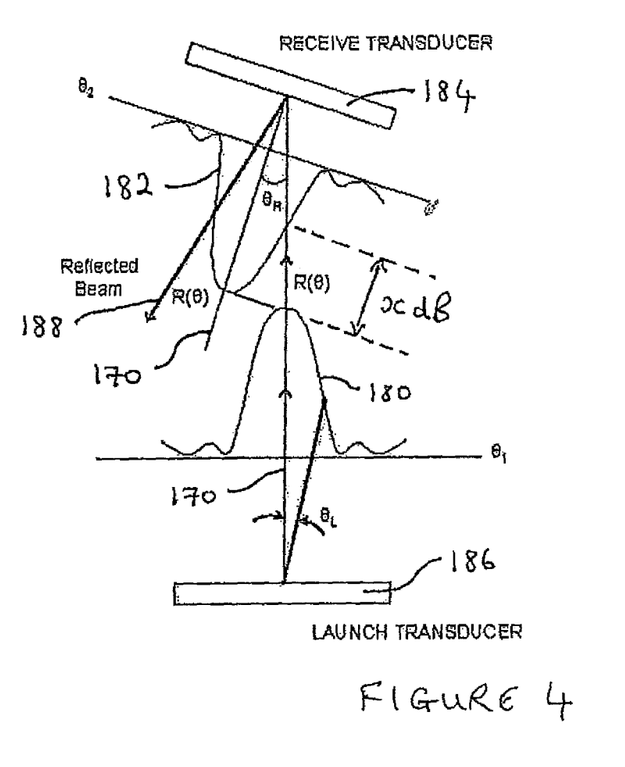
FIG. 4 show an embodiment of the second aspect of the invention, and which also is in accordance with the first aspect.

FIG. 4 shows another embodiment of the invention, in which the wedged carrier plates 125, 130 have different taper angles $\theta_1$, $\theta_2$. For simplicity, the physical structure (which is the same as in FIG. 2) is largely omitted from FIG. 4; only the relevant geometry is shown.

This embodiment makes use of the fact that the reception efficiency of the transducers decreases markedly with increasing deviation from the transducer boresight 170. For a square transducer with a square active electrode as in FIG. 2 the variation in response with angle from boresight $\theta_R$, in a direction parallel to one of the square edges, is a function of $Sinc^2\theta_R$, as shown at 180, 182, and is a consequence of diffraction from an aperture defined by the square active element 115, 120. A transducer having a round active electrode would have a generally similarly shaped, although mathematically distinct, response. For a diamond shaped transducer, where the diagonal axis of the diagonal is parallel to the wedge axis, the variation in response with angle is a function of $\sim Sinc^4\theta_R$.

Because of the angular misalignment, a signal incident on the reception transducer 184 will suffer attenuation of xdB due to the angular misalignment angle $\theta_R$ for the transmitted single transit signal. However because the triple transit signals suffer two reflections off the angularly misaligned transducers, the angle of incidence of the triple transit signal on the reception transducer 184 is three times larger at $3\theta_R$ which yields a significantly higher level of attenuation of ydB for the triple transit signal. Thus at the cost of attenuating the single transit signals by xdB, an improvement relative to the triple transit signals of (y-x)dB is obtained. Some of this gain will however be offset by reduced coupling of power out of the acoustic cavity formed by the angularly misaligned transducers at each of the two intermediate 'strikes' by the acoustic echoes off the sender and receiver transducers.

FIG. 4 appears to show that one of the transducers (here the launch transducer 186) may be set parallel to the surface of the substrate 110 (i.e. $\theta$, =0°). However, in that situation the suppression of resonances in the respective carrier plate (which then is of rectangular section) will not be obtained. It is therefore preferred in this embodiment that not only are $\theta_1$ and $\theta_2$ not equal, but also that neither $\theta_1$ nor $\theta_2$ is equal to zero. The difference between the angles $\theta_1$ and $\theta_2$ is exaggerated in FIG. 4 for clarity. Nevertheless, for transducers of small size communicating through a thick substrate it is possible that the reflected triple transit signal 188 may after its final reflection miss the reception transducer 184 altogether, and thus be completely suppressed.

Figure 5:
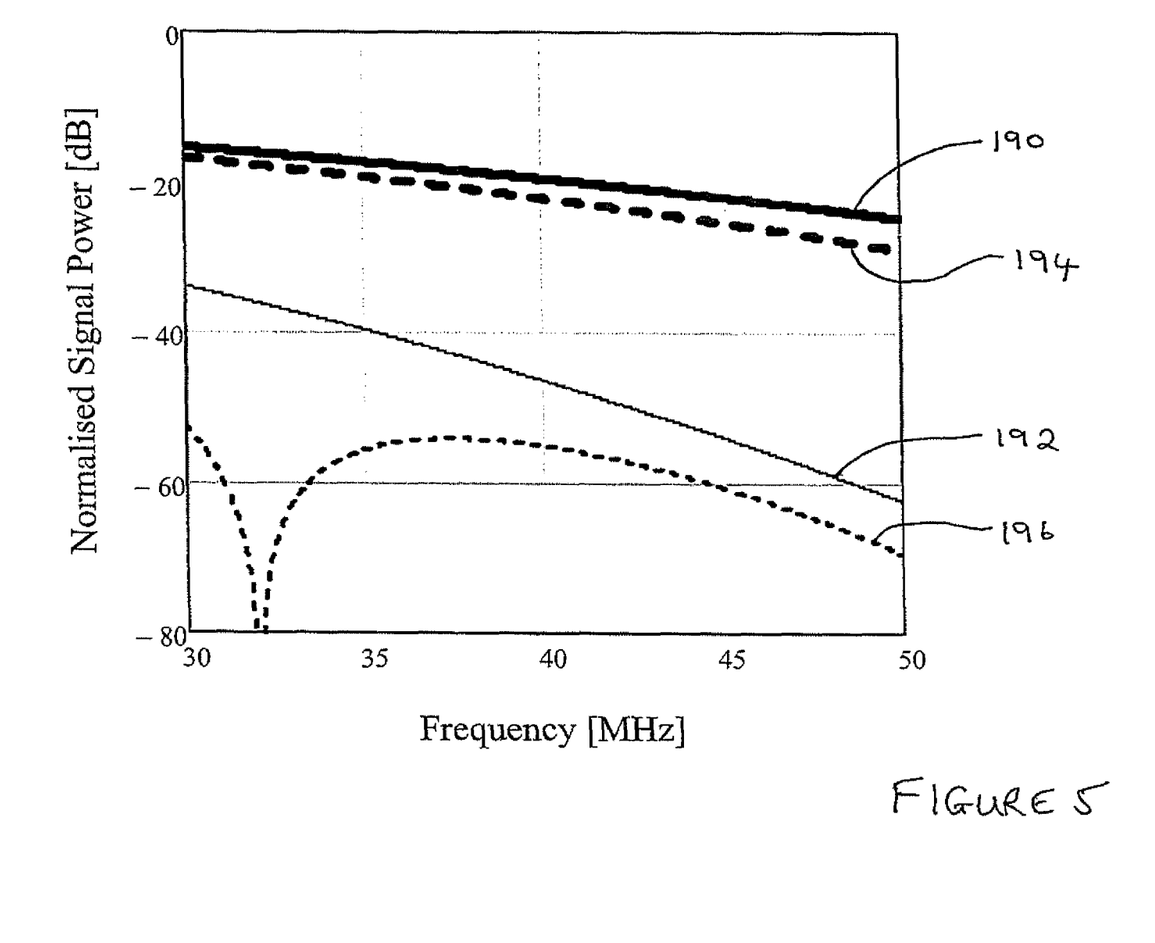
FIGS. 5 and 6 illustrate the predicted performance of an example of the embodiment of FIG. 4.

FIG. 5 illustrates the improvement thought to be obtainable in the suppression of triple-transit signals by the embodiment of FIG. 4. Traces 190, 192 are simulations of the normalised signal powers for an arrangement in which the carrier plates 125, 130 have wedge taper angles of 0°, i.e. they are of rectangular section and the transducers 115, 120 are parallel both to each other and to the surfaces of the substrate 110 to which they are attached. Traces 194, 196 are for the situation in which one of the wedge taper angles $\theta$ is 0.5°, the other remaining at 0°. It can be seen that there is a substantial reduction in the power of the triple-transit signals. The discontinuity in the triple-transit power at 32 MHz is due to phase cancellation of the electrical voltage signals induced at different points on the transducer surface because the path difference traversed by triple transit acoustic rays illuminating the transducer varies by one acoustic wavelength at this frequency across the rectangular aperture of the active electrode 145. These traces are for transducers in which the matching to the electronic circuitry was relatively poor as indicated by the −4 dB return loss. Better matching will reduce the advantage brought by the asymmetric wedged construction, for example a simulation using a return loss of −10 dB indicates that in that case there is no improvement in the suppression of the triple-transit signals above 38 MHz. This is thought to be due to less power being removed from the triple-transit signal at each non-orthogonal reflection from the interface 158 than is removed at each orthogonal reflection when the transducers are parallel to the surfaces of the hull. This indicates that the use of tapered wedges to suppress triple transit signals is more effective when electrical matching is relatively poor, and/or at relatively low frequencies where the multi-path acoustic attenuation of the triple-transit signals is less significant.

Figure 6:
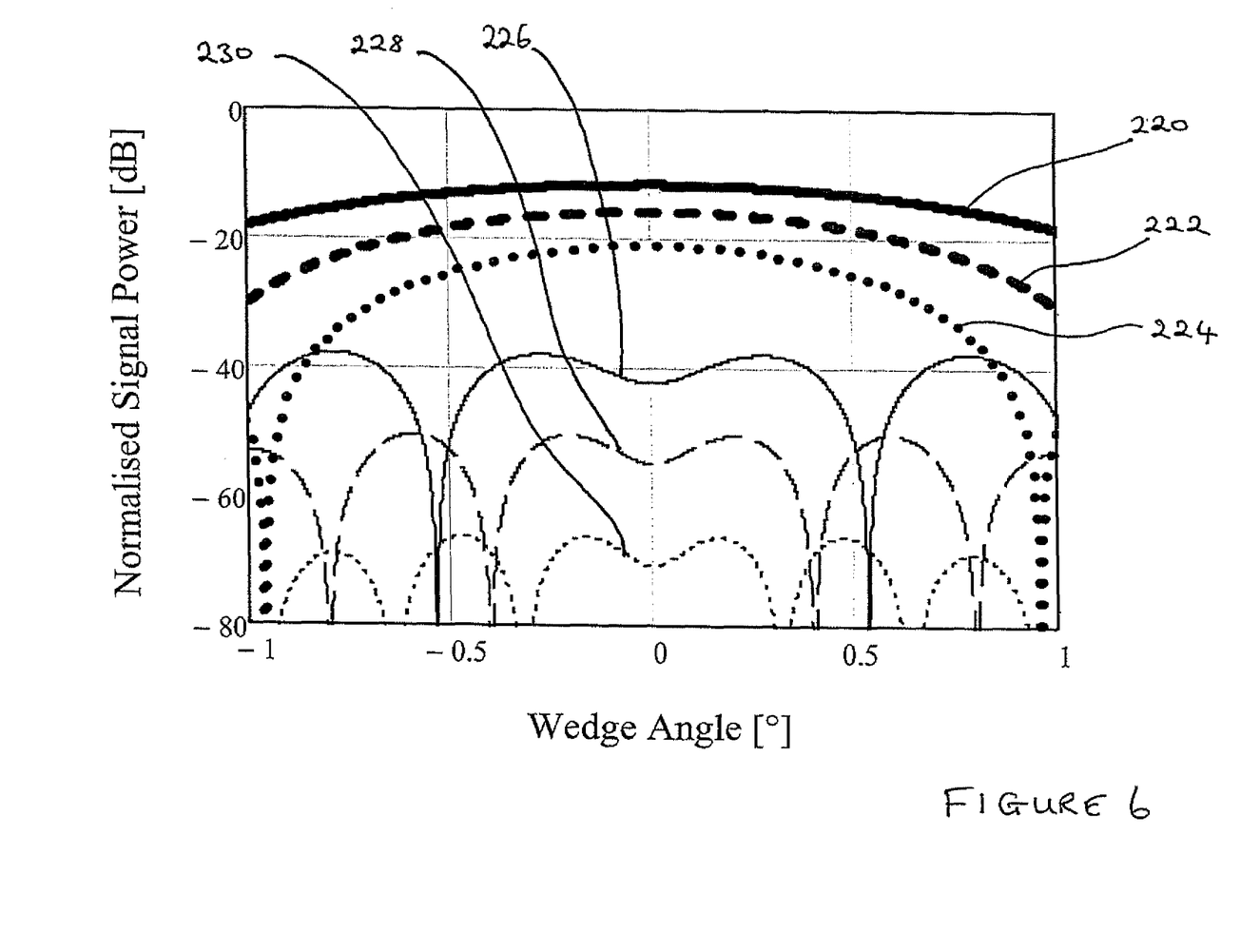

FIG. 6 shows a simulation of the performance of the FIG. 4 apparatus where one of the transducers is set parallel to the hull surface and the other is at various wedge taper angles $\theta$ between −1° and +1°, and for frequencies of 35, 40 and 45 MHz. Traces 220, 222 and 224 are the normalised power for single-transit signals at 35, 40 and 45 MHz, and traces 226, 228, 230 are the normalised powers for triple-transit signals at the same frequencies. The electrical return loss for each transducer in these traces is assumed to be −10 dB.

It can be seen from FIG. 6 that there is an optimal angular offset between the two transducers for suppressing the triple transit signal at any given frequency and that over a relatively narrow frequency range a substantial reduction in the triple transit signal level can be achieved. Given that triple transit signals are more significant at lower frequencies due to lower acoustic absorption of acoustic signals in the barrier, it will generally be more beneficial to optimise the angular offset of the two transducers to suppress triple transit signals at the lower frequencies of intended operation. Although not modelled to date, the use of different shaped electrodes such as for example a diamond configuration as described earlier, provides scope to further suppress triple transit signal levels due to the faster and higher fall off in the transducer angular response with offset angle.

It will be appreciated that the aspects of the invention relating to the attenuation or suppression of triple-transit signals may be implemented separately from the assembly technique, and vice versa. Thus if complete assembly under clean room conditions is possible or appropriate, the hull or other barrier may be prepared with suitably angled surfaces and the transducers fitted directly to it. Also if desired, transducers may be assembled to the barrier so as to have both angular offset (parallel or dissimilar wedges) and lateral offset.

The assembly technique described with reference to FIG. 2 is of general application, and thus can be used also with transducers intended to transmit power through the hull rather than data, bringing the same advantages of ease of assembly. The suppression of multiple-transit signals can be optimised for the nominal frequency of the transmission, because bandwidth is unimportant. For example, the second bonding layer 135, 140 can be made λ/4 thick, although the level of reflection at such a bond layer will be an extremely strong function of the level of acoustic impedance mismatch between the bond layer and the barrier and carrier materials. Alternatively, if acoustic resonance within the carrier plates can be tolerated, the transducers need not be set at an angle to the hull surface. For power transmission therefore the two carrier plates 125, 130 can be of rectangular section rather than wedge-shaped since wide bandwidth operation is no longer important. The thicknesses of the bonding layers should then be either made as thin as possible, which for an adhesive bond to steel would need to be less than λ/100 thick, or alternatively made the equivalent of an integer multiple of one half of an acoustic wavelength (λ/2) thick at the frequency of power transmission so that the bond layer becomes effectively acoustically transparent.

In power transmission applications it may be advantageous to attempt to capture the multiple-transit signals rather than to suppress them. This can lead to some increase in transmission efficiency, at the risk of some phase noise in the received signal. To capture the multiple transit signals, the frequency of power transmission must be set such that the path traversed by the main single-transit signal beam and the principal multi-transit signal beams are different by an integral multiple of acoustic wavelengths such that the electrical signals generated by each of these beams in the receiving transducer are in phase.

To summarise the foregoing disclosure, in apparatus for the acoustic transmission of power or data through a solid barrier such as a ship's hull, assembly of an acoustic transducer to the hull is facilitated by bonding it first to an carrier plate by a thin layer of bonding adhesive and then bonding the carrier plate to the barrier using a second bonding layer. Acoustic matching of the transducer to the carrier plate is achieved by the thin layer, and the mechanically more robust base of the carrier plate can be rubbed on the barrier surface to displace or abrade away any unwanted debris or imperfections which might otherwise prevent the achievement of a thin second bonding layer. This makes the mounting and bonding process more tolerant of imperfections in the barrier surface due to either surface defects or particulate contamination. The transmit and receive transducers may be positioned relative to each other so as to suppress or attenuate multiple-transit signals. Thus the carrier plate may be wedge shaped to aid suppression of triple-transit signals. Transmit and receive transducers may have different wedge angles.

If the present invention is to be deployed in environments which may be subject to thermal shock, for example a −30° C. to +70° C. temperature change at a rate of 5° C. per minute, the second bonding layer (between the intermediate element and the substrate) should be chosen to mitigate the risk of any mechanical failure, such as delamination, associated with such a thermal shock. Accordingly, in such applications the second bonding layer may be formed of a thin flexible bonding layer such as may be provided by a liquid or gel (with the provision of clamping means if the liquid or gel is not inherently adhesive) or by compliant metal bonds (e.g. indium alloys).

Such a provision should be suitable for mitigating the risk of mechanical failure in the bond in the generalised situation where the substrate is strained differently to the intermediate layer.

The invention claimed is:

1. An apparatus for the transmission of an acoustic signal through a solid rigid substrate comprising:
a first acoustic transducer for converting electrical signals into acoustic signals, the first acoustic transducer being mounted on a first face of a solid rigid substrate to transmit the acoustic signals into the substrate;
a second acoustic transducer mounted on a second face of the substrate so as to receive acoustic signals emitted by the first acoustic transducer and to convert the acoustic signals into electrical signals;
and characterised in that at least one of the acoustic transducers is mounted on its respective face of the substrate via an intermediate element, the at least one of the acoustic transducers being bonded by a first bonding layer to the intermediate element, and the intermediate element being attached to the substrate, wherein the intermediate element has mounting pads on a bottom surface, separated from each other, the mounting pads configured to contact the substrate, the mounting pads defining a space between the remainder of the bottom surface of the intermediate element and the substrate.

2. The apparatus of claim 1 wherein the intermediate element is attached to the substrate by a second bonding layer and the thickness of the second bonding layer is configured to enable the passage of acoustic signals of a predetermined frequency and/or bandwidth.

3. The apparatus of claim 1 wherein the intermediate element is attached to the substrate by a second bonding layer and the thickness of the second bonding layer is configured to enable the passage of acoustic signals of a predetermined frequency and/or bandwidth,
and wherein the second bonding layer comprises spacers to define its thickness.

4. The apparatus of claim 1 wherein the intermediate element is attached to the substrate by a second bonding layer and the intermediate element has a grooved or otherwise profiled surface to which the second bonding layer is attached, to accommodate debris present between a face of the substrate and the intermediate element during bonding thereof.

5. The apparatus of claim 1 wherein the intermediate element is of a material which has an acoustic impedance which is the same as or similar to that of the substrate.

6. The apparatus of claim 1 wherein the first and second acoustic transducers are configured respectively to convert and transmit and to receive and convert electrical power via the acoustic signals.

7. The apparatus of claim 1 wherein the first and second acoustic transducers are configured respectively to convert and transmit and to receive and convert electrical power via the acoustic signals
and wherein the thickness of the second bonding layer is such that at the nominal frequency of the acoustic signals, single transit signals and triple transit signals received by the second acoustic transducer are in phase.

8. The apparatus of claim 2, wherein the second bonding layer is a gel.

9. The apparatus of claim 8, wherein the gel has an adhesive property.

10. The apparatus of claim 8, wherein the intermediate element is attached to the substrate by a clamping means and the gel.

11. The apparatus of claim 2, wherein the second bonding layer comprising an indium alloy.

12. The apparatus of claim 2, wherein the second bonding layer is a liquid.

13. The apparatus of claim 1, wherein the at least one of the transducers is the first acoustic transducer.

14. The apparatus of claim 1, wherein the at least one of the transducers is the first and second acoustic transducer.

15. An acoustic transducer assembly for use in the transmission of an acoustic signal through a solid rigid substrate comprising:
   an acoustic transducer for converting electrical signals into acoustic signals or for converting acoustic signals into electrical signals, the acoustic transducer being mounted on a face of a solid rigid substrate to transmit the acoustic signals into the substrate or to receive the acoustic signals; and
   an intermediate element including mounting pads on a bottom surface thereof, the mounting pads being separated from each other and the mounting pads configured to contact the substrate, the mounting pads defining a space between the remainder of the bottom surface of the intermediate element and the substrate, the intermediate element being attached to the substrate and the intermediate element being bonded to the acoustic transducer via a bonding layer.

16. An apparatus for the transmission of an acoustic signal through a solid rigid substrate comprising:
   a first acoustic transducer for converting electrical signals into acoustic signals, the first acoustic transducer being mounted on a first face of a solid rigid substrate to transmit the acoustic signals into the substrate;
   a second acoustic transducer mounted on a second face of the substrate so as to receive acoustic signals emitted by the first acoustic transducer and to convert the acoustic signals into electrical signals;
   and characterised in that at least one of the acoustic transducers is mounted on its respective face of the substrate via an intermediate element, the at least one of the acoustic transducers being bonded by a first bonding layer to the intermediate element, and the intermediate element being attached to the substrate, wherein the intermediate element has mounting pads on a bottom surface, separated from each other, the mounting pads configured to contact the substrate, the mounting pads defining a space between the remainder of the bottom surface of the intermediate element and the substrate, and
   wherein the electrical signals are modulated with data, the first acoustic transducer being configured to transmit the data as data-modulated acoustic signals, the second acoustic transducer being configured to receive said data-modulated acoustic signals.

17. The apparatus of claim 16 wherein the intermediate element is attached to the substrate by a second bonding layer and the thickness of the second bonding layer is chosen so that at a nominal frequency of the data-modulated acoustic signals triple transmit signals in the substrate are substantially attenuated.

18. The apparatus of claim 16 wherein said intermediate element is shaped so as to suppress resonant acoustic reflections between the at least one of the acoustic transducers and a face of the substrate between which the said intermediate element is attached.

19. The apparatus of claim 16 wherein the intermediate element is wedge-shaped.

20. The apparatus of claim 16 wherein respective boresights of the first and second acoustic transducers are substantially parallel to each other, and preferably are substantially coincident.

21. The apparatus of claim 16 wherein respective boresights of the first and second acoustic transducers are not parallel to each other.

22. A method of fitting an acoustic transducer to a solid barrier substrate comprising bonding an active transducer element to a first face of an intermediate element providing mounting pads on a second face of the intermediate element, the mounting pads are separated from each other, the mounting pads being configured to contact the solid barrier substrate, where the mounting pads define a space between the remainder of the second face of the intermediate element and the solid barrier substrate; and then attaching the intermediate element to the solid barrier substrate.

23. The method of claim 22 wherein the attaching comprises bonding the intermediate element to the solid barrier substrate by means of a second bonding layer and the method further comprising monitoring a signal passing to or from the acoustic transducer whilst the intermediate element is being bonded to the solid barrier substrate, as indicative of the thickness of the second bonding layer and/or the position and/or orientation of the acoustic transducer relative to the solid barrier substrate.

24. The method of claim 23 comprising grinding the intermediate element against the solid barrier substrate during the bonding thereof.

25. An apparatus for the transmission of an acoustic signal through a solid rigid substrate comprising:
   a first acoustic transducer for converting electrical signals into acoustic signals, the first acoustic transducer being mounted on a first face of a solid rigid substrate to transmit the acoustic signals into the substrate;
   a second acoustic transducer mounted on a second face of the substrate so as to receive acoustic signals emitted by the first acoustic transducer and to convert the acoustic signals into electrical signals;
   and characterised in that at least one of the acoustic transducers is mounted on its respective face of the substrate via an intermediate element, the at least one acoustic transducers being bonded by a first bonding layer to the intermediate element, and the intermediate element being attached to the substrate,
   wherein the intermediate element is attached to the substrate by a second bonding layer and the intermediate element has a grooved or otherwise profiled surface to which the second bonding layer is attached, to accommodate debris present between a face of the substrate and the intermediate element during bonding thereof.

* * * * *